United States Patent
Johnson et al.

(10) Patent No.: US 8,650,759 B2
(45) Date of Patent: *Feb. 18, 2014

(54) METAL DEMOLITION SHEARS WITH INDEXABLE, INTEGRATED WEAR PLATE/PIERCING TIP

(75) Inventors: Karl Johnson, Duluth, MN (US); Louis Maggio, Brewster, NY (US); Clayton Sederberg, Duluth, MN (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,947

(22) Filed: Jan. 18, 2012

(65) Prior Publication Data

US 2012/0111171 A1 May 10, 2012

Related U.S. Application Data

(62) Division of application No. 10/697,554, filed on Oct. 31, 2003, now Pat. No. 8,146,256.

(51) Int. Cl.
*B02C 1/06* (2006.01)
(52) U.S. Cl.
USPC .................. 30/134; 30/228; 241/101.73
(58) Field of Classification Search
USPC ........ 30/134, 228, 92, 180; 83/609, 928, 694; 144/34.5; 241/101.73, 300, 101.75, 241/264–269; 225/103; 72/144, 326, 330
See application file for complete search history.

(56) References Cited

U.S. PATENT DOCUMENTS

| | | | |
|---|---|---|---|
| 402,381 A | 4/1889 | Aiken | |
| 4,403,431 A | 9/1983 | Ramun et al. | |
| 4,450,625 A | 5/1984 | Ramun et al. | |
| 4,519,135 A | 5/1985 | LaBounty | |
| 4,543,719 A | 10/1985 | Pardoe | |
| 4,558,515 A | 12/1985 | LaBounty | |
| 4,616,417 A | 10/1986 | Gross | |
| 4,669,187 A | 6/1987 | Pardoe | |
| 4,670,983 A | 6/1987 | Ramun et al. | |
| 4,686,767 A | 8/1987 | Ramun et al. | |
| 4,771,540 A | 9/1988 | LaBounty | |
| 4,776,093 A | 10/1988 | Gross | |
| 4,838,493 A | 6/1989 | LaBounty | |
| 4,897,921 A | 2/1990 | Ramun | |
| 4,951,886 A | 8/1990 | Berto | |

(Continued)

FOREIGN PATENT DOCUMENTS

EP 0 760 268 3/1997

OTHER PUBLICATIONS

Office Action as issued for U.S. Appl. No. 13/530,699, dated Aug. 31, 2012.

*Primary Examiner* — Phong Nguyen
(74) *Attorney, Agent, or Firm* — Pillsbury Winthrop Shaw Pittman LLP

(57) ABSTRACT

The invention features an indexable wear plate/piercing tip insert that is configured to be removably and repositionably attached to the front, nose portion of the upper, movable jaw of a metal demolition shears. The insert functions as both a wear plate and a piercing tip and is indexable in that a non-worn or less worn portion of the wear surface of the wear plate portion of the insert, and non-worn shearing and piercing edges of the piercing tip portion of the insert, can be presented simultaneously simply by rotating the insert 180° and reattaching it to the nose portion of the upper, movable jaw of a metal demolition shears.

11 Claims, 13 Drawing Sheets

(56) References Cited

U.S. PATENT DOCUMENTS

| | | |
|---|---|---|
| 5,044,569 A | 9/1991 | LaBounty et al. |
| 5,060,378 A | 10/1991 | LaBounty et al. |
| 5,062,227 A | 11/1991 | De Gier et al. |
| 5,127,567 A | 7/1992 | LaBounty et al. |
| 5,146,683 A | 9/1992 | Morikawa et al. |
| 5,183,216 A | 2/1993 | Wack |
| 5,187,868 A | 2/1993 | Hall |
| 5,197,193 A | 3/1993 | Smith |
| 5,224,268 A | 7/1993 | Pemberton |
| 5,230,151 A | 7/1993 | Kunzman et al. |
| 5,291,657 A | 3/1994 | Morikawa et al. |
| 5,339,525 A | 8/1994 | Morikawa |
| 5,359,775 A | 11/1994 | Morikawa et al. |
| 5,361,999 A | 11/1994 | Sakato et al. |
| 5,375,329 A | 12/1994 | Morikawa et al. |
| 5,384,962 A | 1/1995 | Pemberton |
| 5,385,311 A | 1/1995 | Morikawa et al. |
| 5,471,747 A | 12/1995 | Morikawa et al. |
| 5,474,242 A | 12/1995 | Rafn |
| 5,478,019 A | 12/1995 | Morikawa et al. |
| 5,531,007 A | 7/1996 | LaBounty |
| 5,553,682 A | 9/1996 | Batliner et al. |
| RE35,432 E | 1/1997 | LaBounty et al. |
| 5,619,881 A | 4/1997 | Morikawa et al. |
| 5,669,141 A | 9/1997 | Morikawa et al. |
| 5,671,892 A | 9/1997 | Morikawa et al. |
| 5,704,560 A | 1/1998 | Wimmer |
| 5,715,603 A | 2/1998 | Dorguin |
| 5,822,893 A | 10/1998 | Ostermeyer |
| 5,894,666 A | 4/1999 | Hrusch |
| 5,923,958 A | 7/1999 | Chou |
| 5,926,958 A | 7/1999 | Ramun |
| 5,940,971 A | 8/1999 | Ramun |
| 5,946,830 A | 9/1999 | Ostermeyer |
| 5,992,023 A | 11/1999 | Sederberg et al. |
| 6,047,475 A | 4/2000 | Tyrrell et al. |
| 6,061,911 A | 5/2000 | LaBounty et al. |
| 6,119,970 A | 9/2000 | LaBounty et al. |
| 6,151,784 A | 11/2000 | Maruyama |
| 6,202,308 B1 | 3/2001 | Ramun |
| 6,298,560 B1 | 10/2001 | Lee |
| 6,839,969 B2 | 1/2005 | Jacobson et al. |
| 6,871,673 B2 | 3/2005 | Crittenden et al. |
| 6,926,217 B1 | 8/2005 | Labounty et al. |
| 6,994,284 B1 | 2/2006 | Ramun |
| 7,044,037 B2 | 5/2006 | Cossette et al. |
| 2005/0091852 A1 | 5/2005 | Johnson et al. |
| 2005/0199758 A1 | 9/2005 | Ramun |
| 2006/0086848 A1 | 4/2006 | Ramun |
| 2006/0131454 A1 | 6/2006 | Ramun et al. |

METAL DEMOLITION SHEARS WITH INDEXABLE, INTEGRATED WEAR PLATE/PIERCING TIP

CROSS-REFERENCE

This application is a divisional application of U.S. Ser. No. 10/697,554, titled "METAL DEMOLITION SHEARS WITH INDEXABLE, INTEGRATED WEAR PLATE/PIERCING TIP," filed Oct. 31, 2003 now U.S. Pat. No. 8,146,256, the entire contents of which are hereby incorporated by reference herein.

FIELD OF THE INVENTION

The invention relates to metal demolition shears. More particularly, the invention relates to the cutting/piercing elements thereof.

BACKGROUND OF THE INVENTION

A conventional configuration for a metal demolition shears 900 as known in the prior art is illustrated in FIGS. 1 and 2. The shears 900 are configured to be attached to the boom structure of, for example, excavating or earth-moving excavation equipment such as that made by Caterpillar, Komatsu, Hitachi, Kobelco, etc. The shears 900 include a lower, fixed or stationary jaw 902 and an upper, movable jaw 904. The upper, movable jaw 904 is pivotally mounted by means of pivot structure 906, which includes, for example, a main shaft, tie rod, rotation bearings and thrust bearing, end caps, and fasteners so as to pivot relative to the lower fixed or stationary jaw 902, as illustrated by double-headed arrow 908. Piston member 910 articulates (drives) the upper, movable jaw 904 for such pivoting movement. The stationary jaw 902 is mounted into a stick weldment structure 912 that supports the piston member 910 and the pivoting upper jaw 904, and the stick weldment structure 912 is mated to the boom of the machinery by means of a fixed mounting bracket 913 (FIG. 1) or a rotational mounting adapter 914 (shown in FIG. 2) and rotational drive system (not shown in FIG. 1).

The lower, fixed jaw 902 includes a fixed blade member 916 and a guide member 920. The guide blade member 920 is laterally spaced from the fixed blade member 916 and extends generally parallel to the fixed blade member 916. A cross-member 922 extends between and is connected to the endmost portions of the fixed blade member 916 and the guide member 920. Together, the fixed blade member 916, guide member 920, and cross-member 922 define a slot 924 into which the upper, movable jaw 904 moves during operation of the shears 900.

The shears 900 includes a number of hardened metal inserts that provide various cutting, piercing, or load-supporting edges and surfaces. In particular, the lower, fixed jaw 902 has a pair of hardened steel blade insert members 926, and the upper, movable jaw 904 has a pair of hardened steel insert members 928. The blade insert members 926 and 928 fit within correspondingly configured recesses or seating surfaces formed in the lower and upper jaws 902 and 904, respectively, and are secured therein, e.g., by bolts. As the shears 900 is operated and the upper, movable jaw 904 is pivoted closed relative to the lower, fixed jaw 902, the blade insert members 928 in the upper, movable jaw 904 move past the blade insert members 926 in the lower, fixed jaw 902, and the cutting edges 930 and 932 of the lower and upper blade insert members 926, 928, respectively, co-act to shear or cut a workpiece such as I-beams, pipes, scrap sheet metal, etc. held between the jaws of the shears. As disclosed, for example, in U.S. Pat. No. 5,992,023, the blade insert members may be indexable, meaning that they can be reoriented and repositioned to present new or fresh cutting edges as the cutting edges 930, 932 become worn.

As the upper, movable jaw 904 pivots downward to shear a workpiece between the steel blade insert members 926 and 928, the workpiece tends to force the upper, movable jaw 904 laterally away from the fixed blade member 916 of the lower, fixed jaw 902. The guide member 920 limits or constrains such lateral deflection of the upper, movable jaw 904. As a result, as the movable jaw 904 pivots downward into the slot 924, the lateral surface 934 of the nose portion 936 of the movable jaw 904 bears against inner-facing surface 938 of the guide member 920. Therefore, a hardened steel wear plate 940 is customarily secured to the lateral surface 934 of the nose portion 936, and a hardened steel wear insert 942 is secured to the inner-facing surface 938 of the guide member 920.

In addition to the blade insert members 926, 928, wear plate 940, and wear insert 942, a shears 900 conventionally has a hardened steel piercing tip 944 that is secured, e.g., by welding to a lower surface of the nose portion 936 at a forwardmost portion thereof. A hardened steel cross blade insert 946 is secured within a correspondingly shaped recess in the cross member 922 and cooperates with and/or provides a cutting surface against which the piercing tip 944 engages when the shears 900 is being used to pierce holes through larger, generally flattened pieces of scrap metal.

Customarily, the various cutting, supporting, piercing, and/or wear elements described above (the blade insert members 926, 928, the wear plate 940, the wear insert 942, the piercing tip 944, and the cross blade insert 946) are provided as individual, separate components.

BRIEF SUMMARY OF THE INVENTION

The present invention features an indexable wear plate/piercing tip insert that is configured to be removably and repositionably attached to the front, nose portion of the upper, movable jaw of a metal demolition shears. The insert functions as both a wear plate and a piercing tip and is indexable in that a non-worn or less worn portion of the wear surface of the wear plate portion of the insert and non-worn shearing and piercing edges of the piercing tip portion of the insert can be presented simultaneously simply by rotating the insert 180° and reattaching it to the nose portion of the upper, movable jaw of a metal demolition shears. This configuration simplifies maintenance of the shears and reduces the number of different parts that need to be kept in inventory, thus reducing operational costs. Additionally, because the wear plate/piercing tip insert is configured to be removable and repositionable, it is not welded onto the upper jaw or weldment. Therefore, an additional welding step is eliminated as a result of the bolt-on configuration of the wear plate/piercing tip of the invention.

Thus, according to a first aspect, the invention features an indexable wear plate/piercing tip insert that is configured to be attached at a front, nose portion of a correspondingly configured movable jaw of a metal demolition shears. The wear plate/piercing tip insert has a body portion, a surface of which provides a wear surface, and at least a pair of laterally extending or protruding tip portions that provide multiple piercing tips for the movable jaw. The geometric configuration of the wear plate/piercing tip insert is essentially the same in a first position and a second position, the second position being a position in which the wear plate/piercing tip insert is rotated about a pivot axis passing centrally through the wear plate/piercing tip insert. As a result, a non-worn or less worn portion of the wear surface of the insert and non-worn or less worn shearing and piercing edges of the insert can be presented simultaneously for the metal demolition shear by rotating the wear plate/piercing tip insert about its pivot axis, from the first position to the second position, and reseating the wear plate/piercing tip insert on the movable jaw.

According to one embodiment of the wear plate/piercing tip insert, the second position is a position in which the wear plate/piercing tip insert is rotated by 180° about its pivot axis. Additionally, the wear plate/piercing tip insert may have shearing edges on each tip portion that are coplanar with and that form an edge of the wear surface. The wear plate/piercing tip may also have at least one support boss that is located between the metal tip portions and that extends laterally from a central region of the wear plate/piercing tip to provide bearing support to help prevent the wear plate/piercing tip insert from being sheared off of the movable jaw during cutting and retracting operation of the shears on which the wear plate/piercing insert is mounted.

According to a second aspect, the invention features a metal demolition shears having an indexable wear plate/piercing tip insert, generally as per the first aspect of the invention. The shears has a fixed jaw and a movable jaw, with the indexable wear plate/piercing tip insert being seated on the movable jaw at a forward, nose portion of the movable jaw.

According to an embodiment of the invention, the shears has a fixed jaw including a fixed blade member with a first cutting/shearing edge extending along it and a guide member spaced from and extending in generally parallel relation to the fixed blade member. The shears also has a movable jaw that pivots relative to the fixed jaw, with a second cutting/shearing edge extending along the movable jaw. An indexable wear plate/piercing tip insert is attached at a front, nose portion of the movable jaw.

The front, nose portion of the movable jaw has a pocket or cavity into which the tip portions of the wear plate/piercing tip insert each fit, with one of the tip portions being fitted in the pocket or cavity when positioned in a non-operative position. The pocket or cavity has contours that match surface contours of the tip portions. Additionally, the front, nose portion of the movable jaw has a notch formed in an underside thereof, with the notch having surface contours that match surface contours of each of the tip portions. The tip portion that is positioned in an operative position engages with the notch.

The second cutting/shearing edge may be provided by at least one blade insert member, with the blade insert member extending all the way to a forwardmost portion of the front, nose portion of the movable jaw. An inner-facing surface of one of the tip portions that is in an operative position may engage with an inner-facing surface of the blade insert, such that a forward portion of the blade insert and a forward, lower portion of the tip portion in the operative position together define a piercing tip portion of the movable jaw.

According to a third aspect, the invention features a jaw member for use in a metal demolition shears (for example, but not necessarily, the upper, movable jaw member). The jaw member has an indexable wear plate/piercing tip insert, generally as per the first aspect of the invention.

According to a fourth aspect, the invention features a jaw member for use in a metal demolition shears (for example, but not necessarily, the upper, movable jaw member). The jaw member is configured to receive an indexable wear plate/piercing tip insert, generally as per the first aspect of the invention.

BRIEF DESCRIPTION OF THE DRAWINGS

These and other aspects and features of the invention will be described in greater detail below in connection with the drawings, in which.

DETAILED DESCRIPTION OF THE INVENTION

Figure 1:
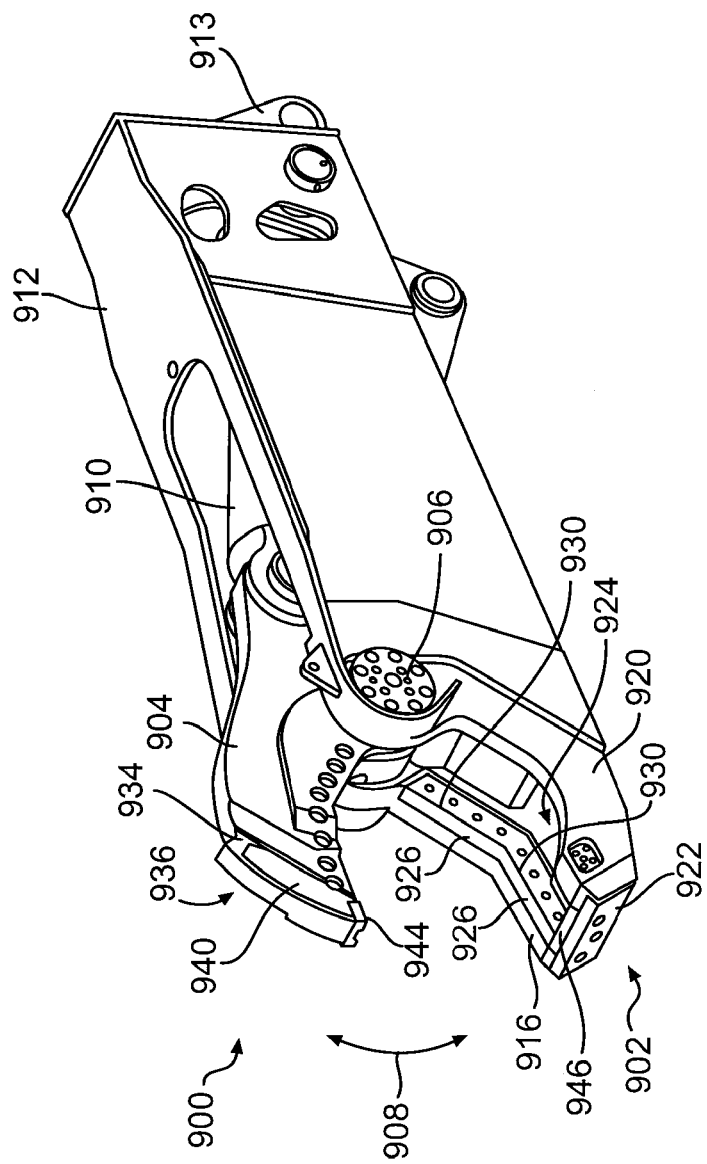
FIGS. 1 and 2 are perspective views, from different angles, of a metal demolition shears according to the prior art.
Figure 2:
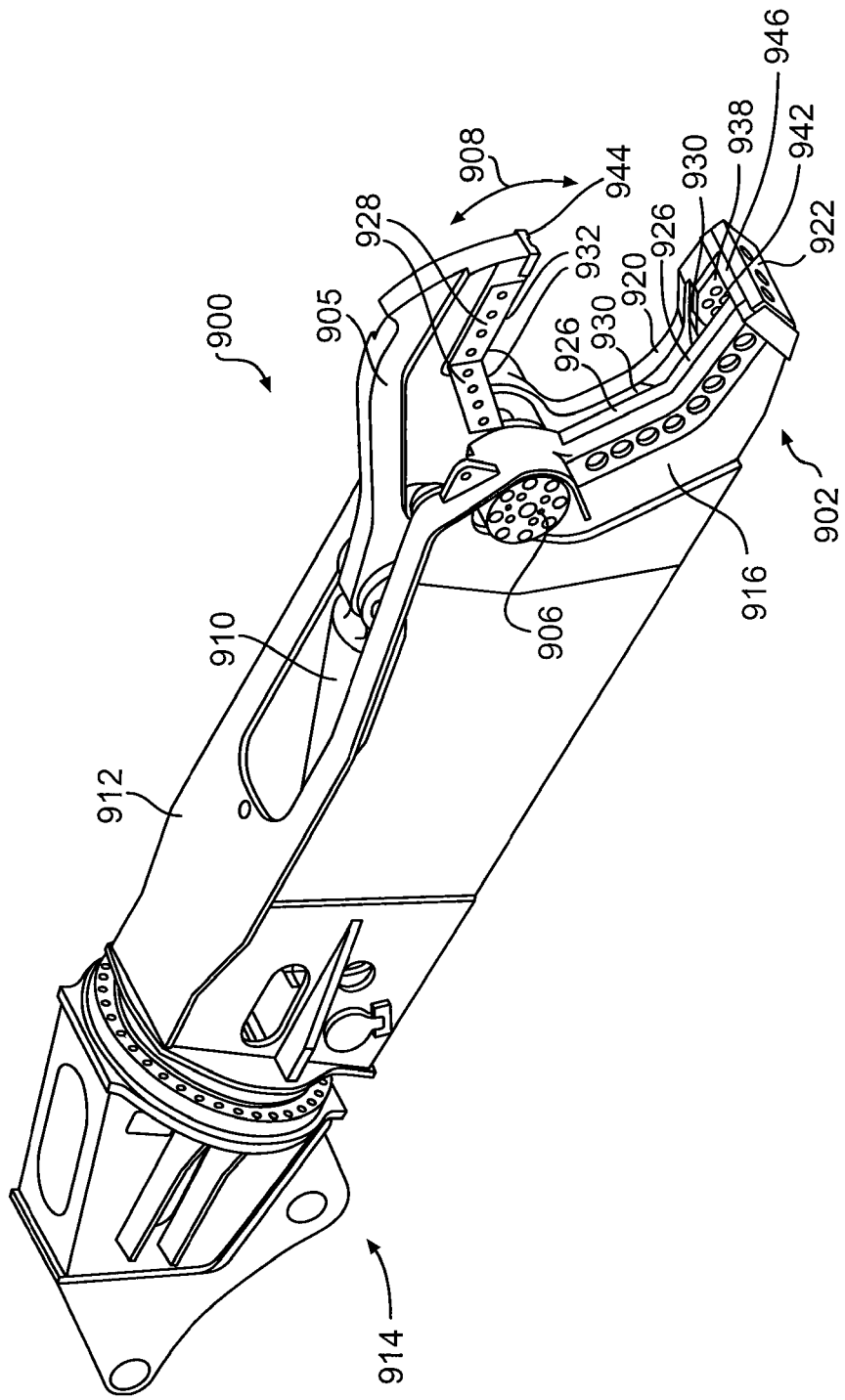
Figure 3:
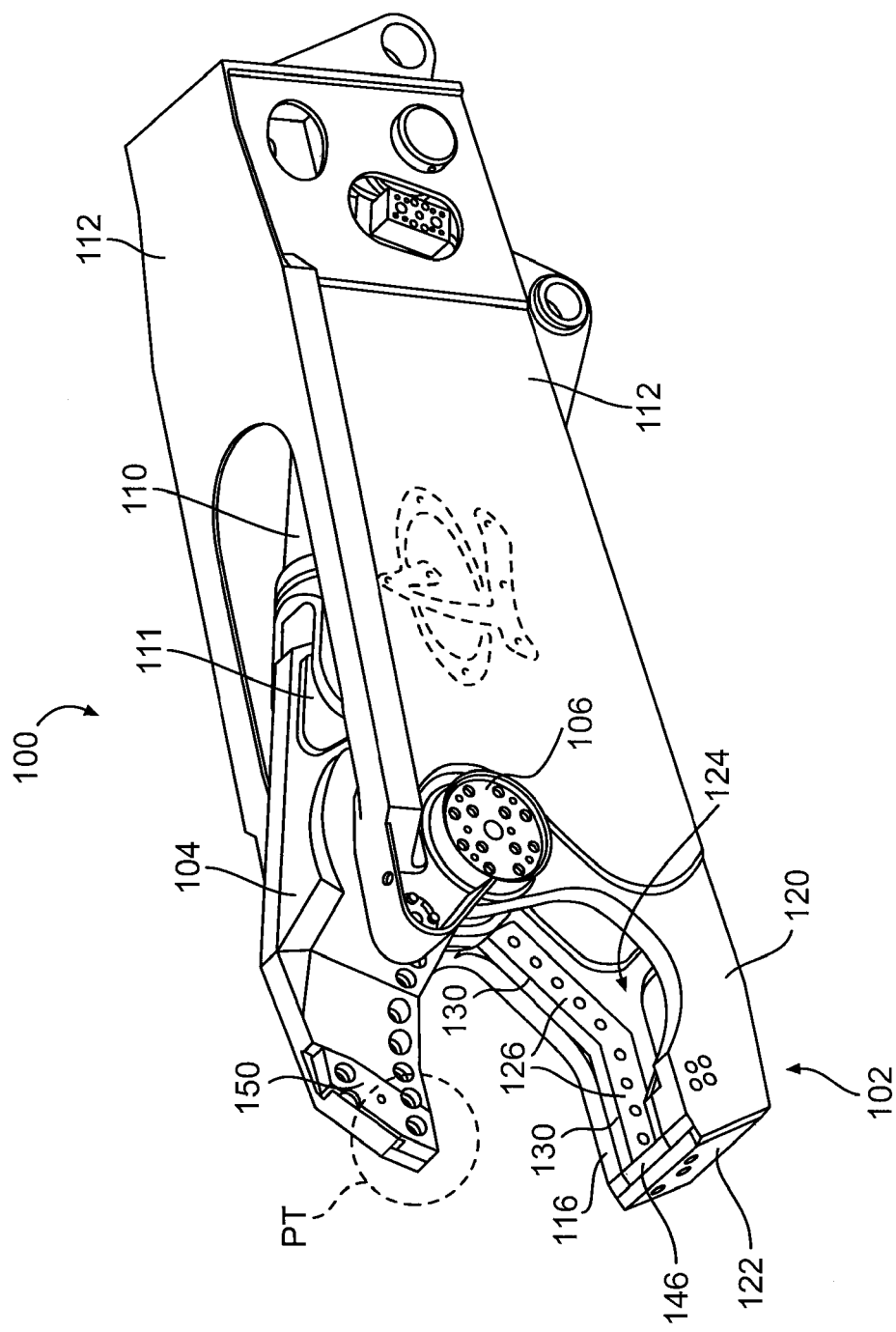
FIGS. 3 and 4 are perspective views, from different angles, showing a metal demolition shears according to the invention.
Figure 4:
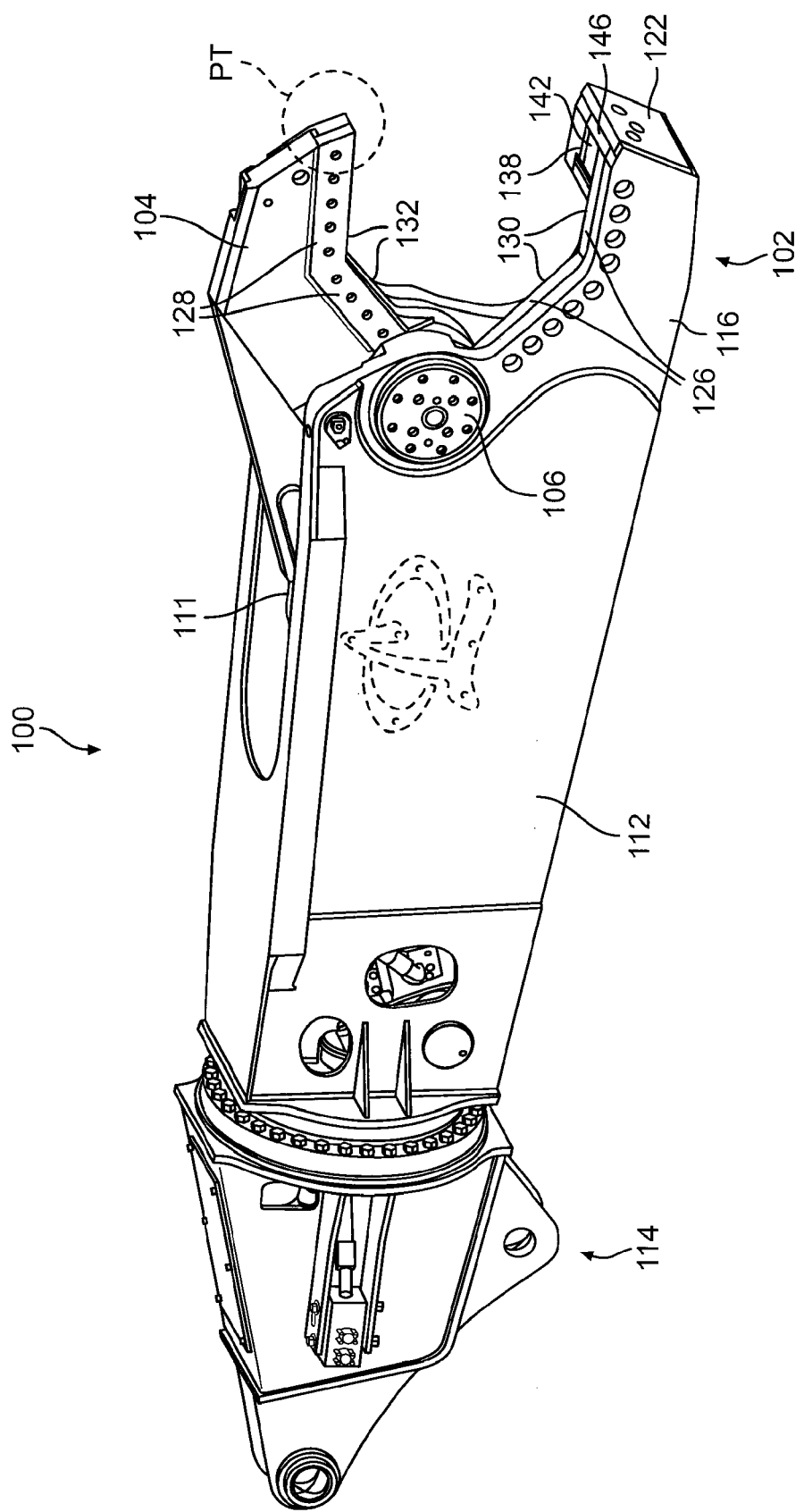
Figure 5:
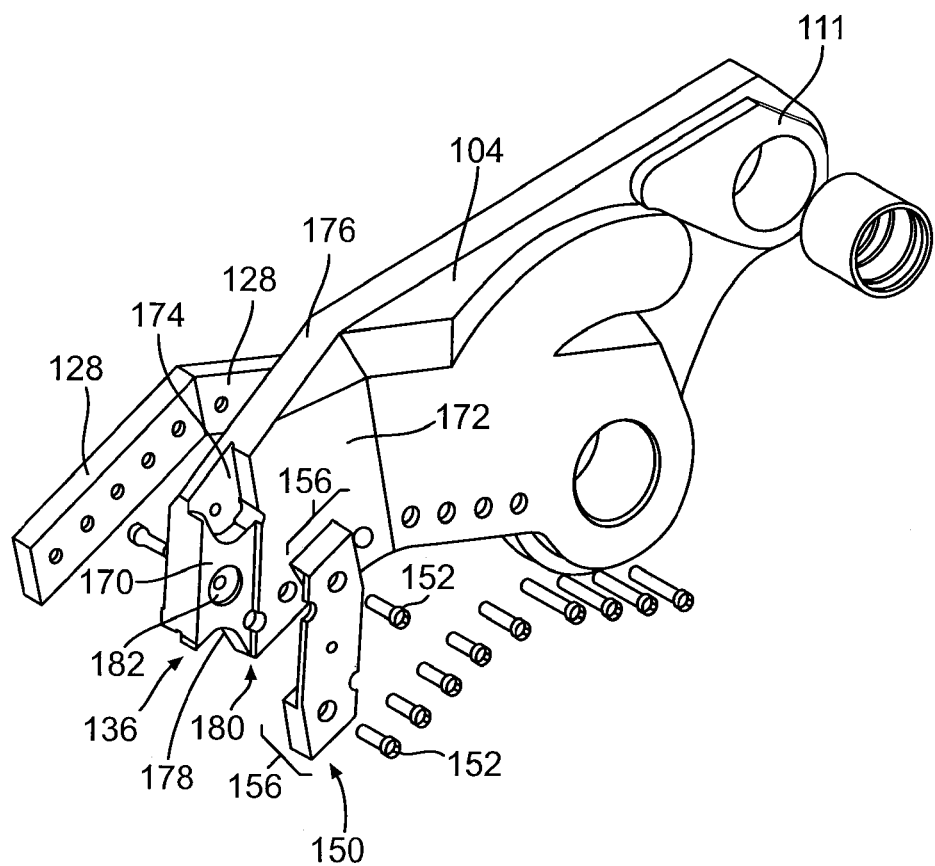
FIG. 5 is an exploded, perspective view showing the upper, movable jaw of a metal demolition shears according to the invention, as illustrated in FIGS. 3 and 4.
Figure 6:
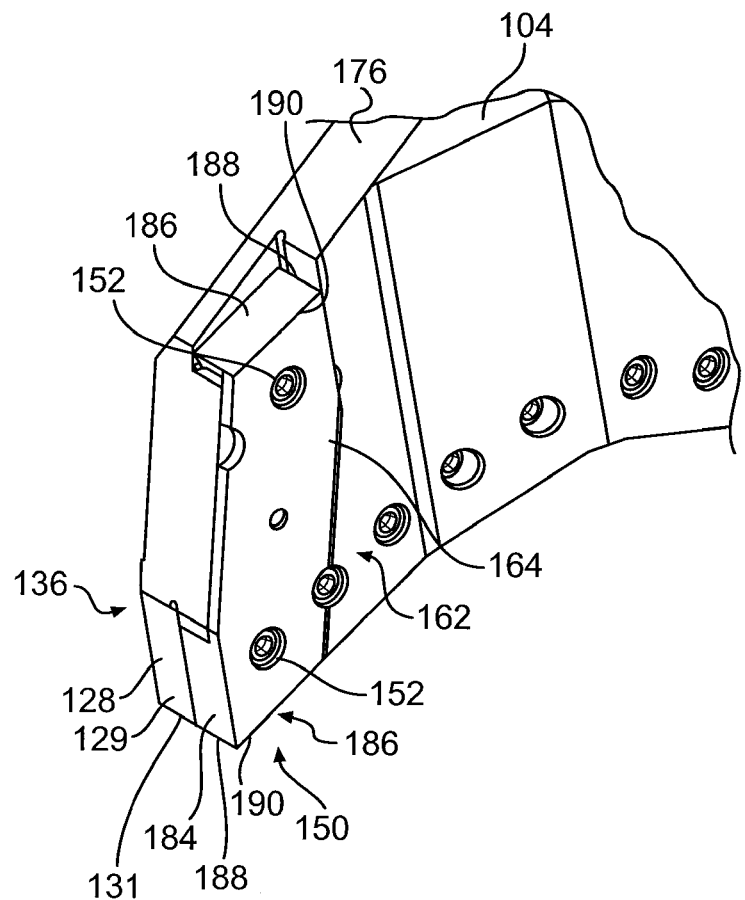
FIG. 6 is a perspective view showing a portion of the upper, movable jaw illustrated in FIGS. 3-5.
Figure 7:
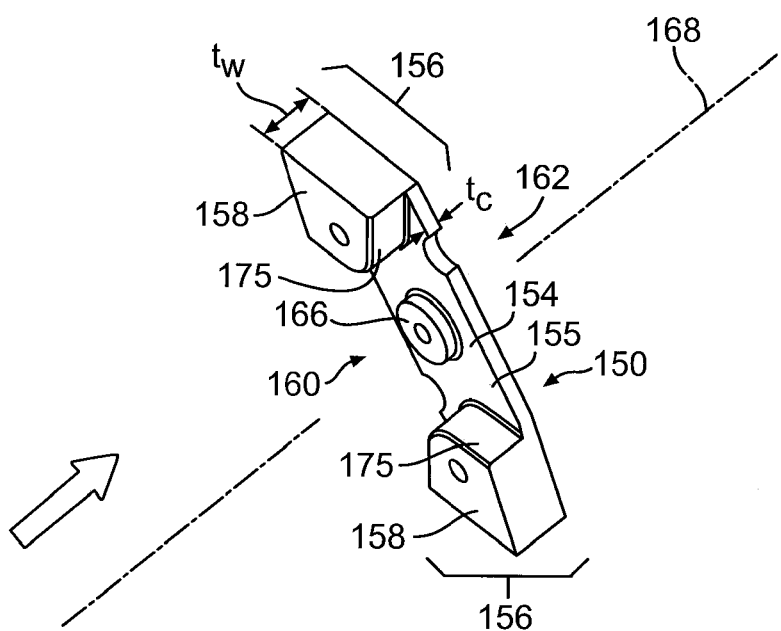
FIG. 7 is a perspective view illustrating an indexable wear plate/piercing tip according to the invention.

A shears 100 according to the invention is illustrated in FIGS. 3 and 4, with an indexable wear plate/piercing tip insert 150 according to the invention being illustrated in greater detail in FIGS. 5-7. Like the prior art shears 900 illustrated in FIGS. 1 and 2, the shears 100 includes a lower, fixed jaw 102 and an upper, movable jaw 104 that is mounted by pivot structure 106 so as to be able to pivot relative to the lower, fixed jaw 102. A piston member 110 is pivotally attached to a piston connection point 111 and extends and retracts to drive the upper, movable jaw 104 to open and close the shears 100. The lower and upper jaws 102, 104, pivot structure 106, and piston member 110 are all mounted within or supported by a stick weldment structure 112, which is mounted by means of a rotational fitting or adapter (not shown) to the boom or dipstick structure of an excavator or other heavy-duty equipment.

The lower, fixed jaw 102 includes a fixed blade member 116 and a guide member 120 that is laterally spaced from and extends generally parallel to the fixed blade member 116. A cross member 122 is attached (e.g., welded) to the endmost portions of the blade member 116 and guide member 120, with a hardened steel cross member insert 146 secured within a correspondingly shaped recess on the inner-facing side of the cross member 122. Together, the fixed blade member 116, guide member 120, and cross member 122 form or define a slot 124 into which the upper, movable jaw 104 moves as it pivots to close the shears 100 during shearing operation of the shears 100.

A pair of indexable hardened steel blade insert members 126 are removably attached (e.g., by bolts) to the fixed blade member 116, and a pair of indexable hardened steel blade insert members 128 are removably attached (e.g., by bolts) to the upper, movable jaw 104. The blade insert members 126, 128 provide cutting edges 130, 132, respectively. To this extent, the construction of the shears 100 according to the invention is generally the same as that of the shears 900 explained above as representative of the prior art.

As further illustrated in FIGS. 3 and 4, and as illustrated in greater detail in FIGS. 5-7, an integral, indexable, wear plate/piercing tip insert 150 is removably secured to the forward, nose portion 136 of the upper, movable jaw 104 by means, for example, of cap screws or plow bolts 152. The wear plate/piercing tip insert 150 is preferably made from hardened, wear-resistant tool steel and has a central region 154 and ends 156. A tip portion 158 protrudes laterally from each end 156 of the wear plate/piercing tip insert 150, with the tip portions 158 both protruding toward the same side 160 of the wear plate/piercing tip insert 150. The opposite side 162 of the wear plate/piercing tip insert 150, on the other hand, has a generally planar surface 164. As described in greater detail below, the planar surface 164 provides a wear surface for the wear plate/piercing tip insert 150.

Figure 8B:
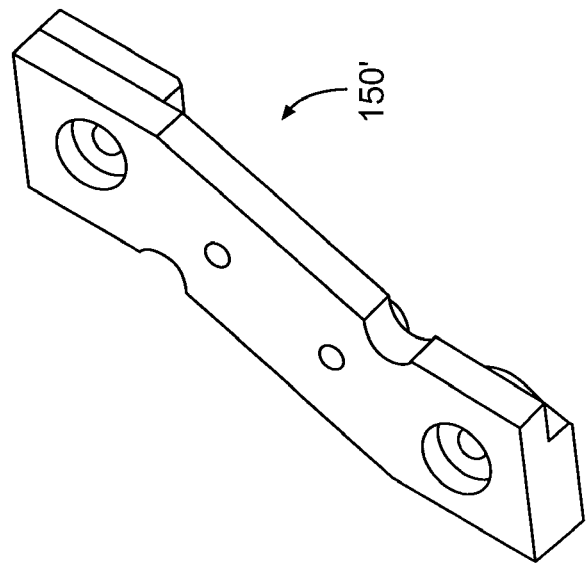
FIGS. 8*a* and 8*b* and perspective views from opposite sides of an alternate embodiment of an indexable wear plate/piercing tip according to the invention.
Figure 8A:
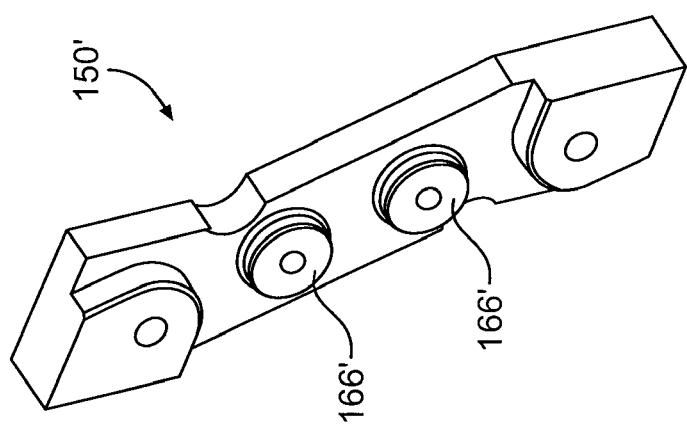
Figure 9:
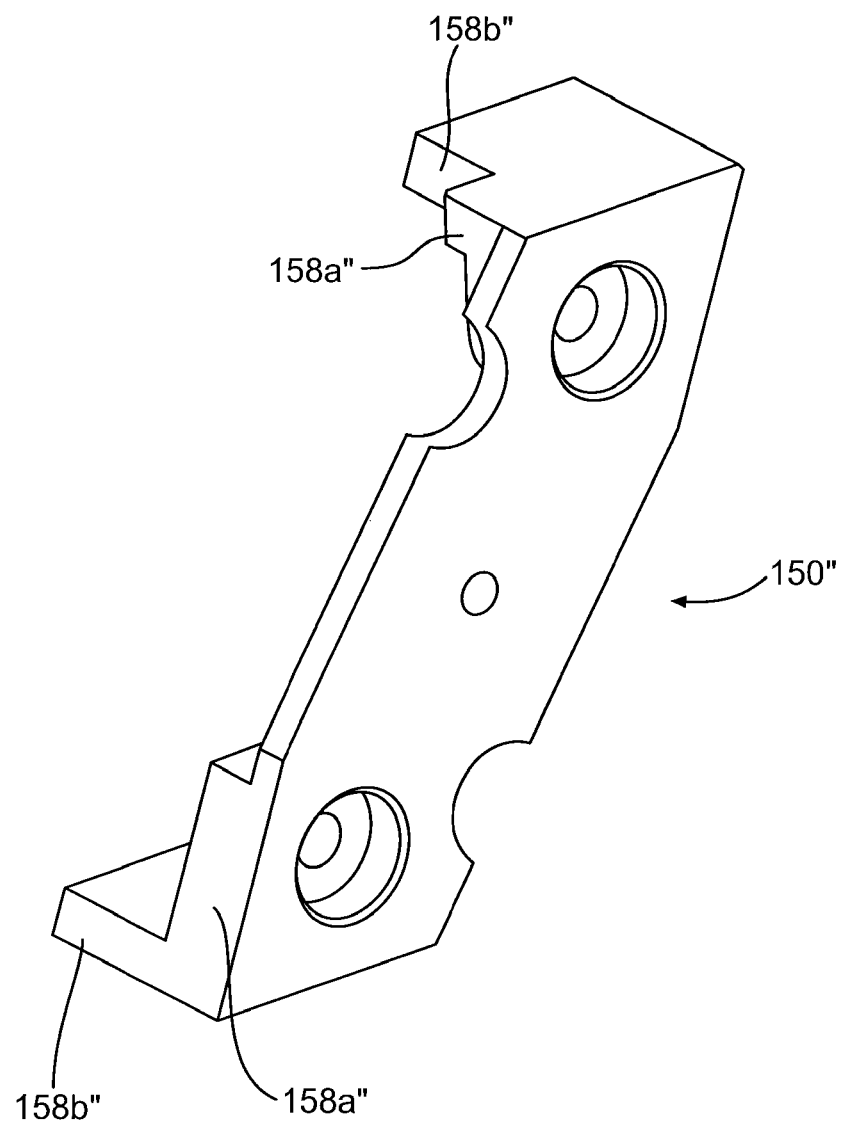
FIG. 9 is a perspective view showing another alternate embodiment of an indexable wear plate/piercing tip according to the invention.
Figure 10:
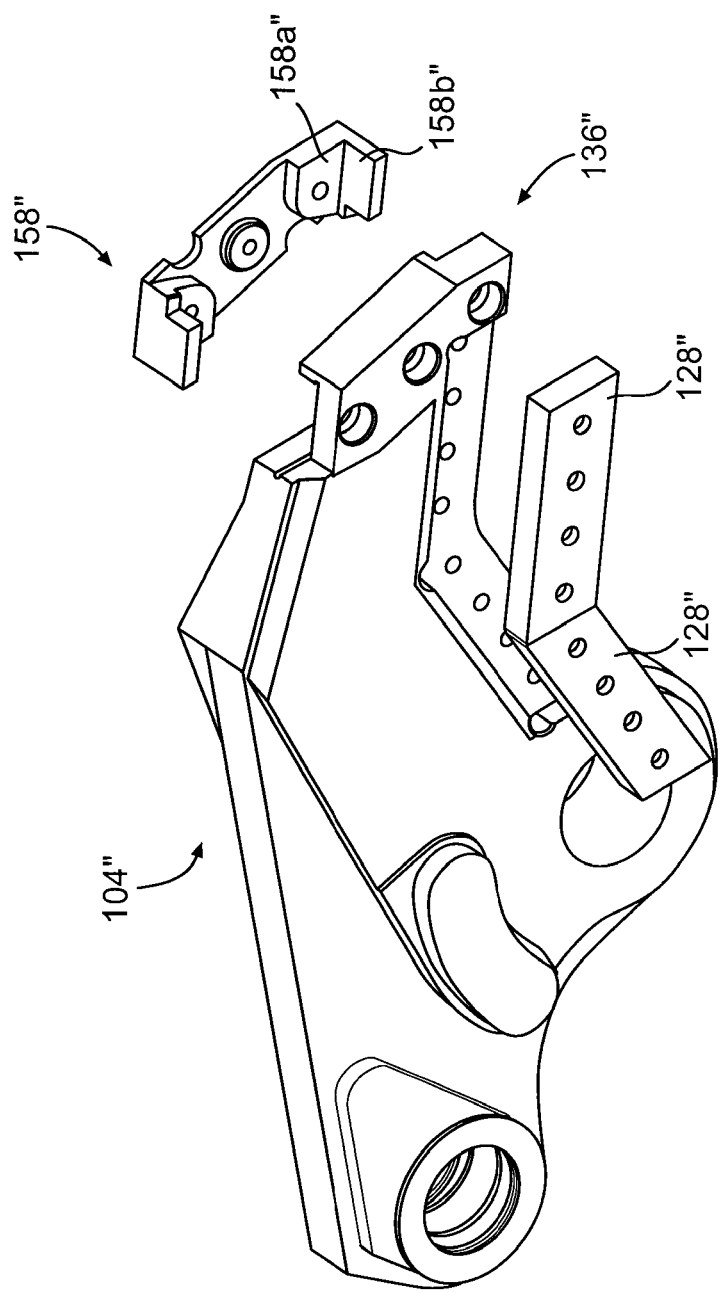
FIG. 10 is an exploded, perspective view showing an alternate embodiment of the upper, movable jaw of a metal demolition shears according to the invention, employing the indexable wear plate/piercing tip illustrated in FIG. 9.
Figure 11:
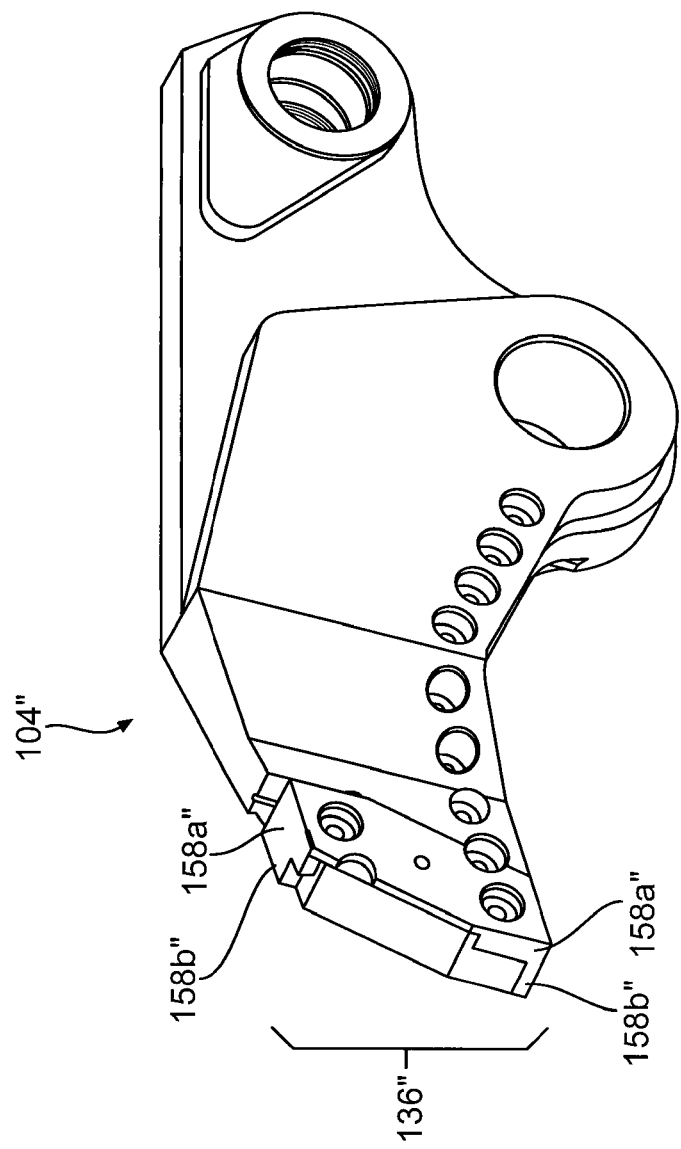
FIGS. 11 and 12 are perspective views from opposite sides showing the upper, movable jaw of a metal demolition shears illustrated in FIG. 10, as assembled.
Figure 12:
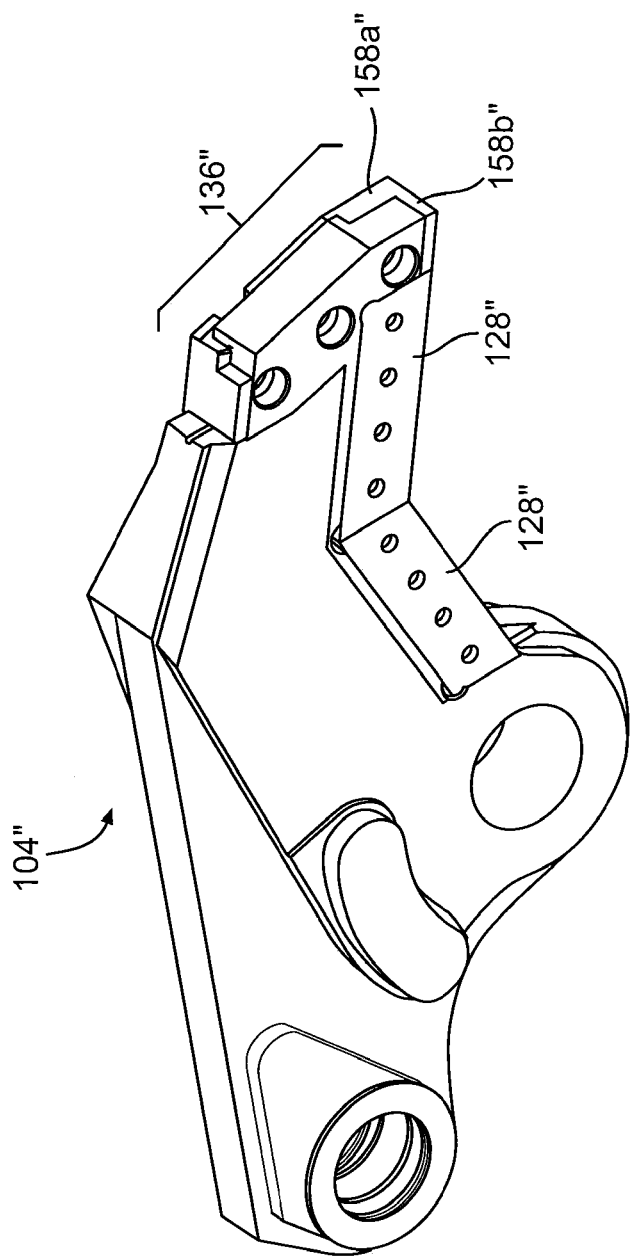

In addition to the tip portions 158, a central, circular boss 166 (or similar dowel-type insert) also extends laterally from the central region of the wear plate/piercing tip insert 150, toward the side 160 of the wear plate/piercing tip insert 150. The boss 166 (or dowel) seats in a corresponding bore or depression 182 (described further below) in the movable, upper jaw 104 to provide support and bearing resistance against the forces to which the wear plate/piercing tip 150 is subjected during both cutting and retraction movement of the upper, movable jaw 104, as well as to transfer those loads to the main, structural body of the upper jaw 104. Depending on the size of the loads to which the wear plate/piercing tip will be subjected, it may be desirable to provide two or more such bosses 166' on a wear plate/piercing tip insert 150', as illustrated in FIGS. 8a and 8b.

The wear plate/piercing tip insert 150 is "pivotally symmetric." In other words, the geometric configuration of the wear plate/piercing tip insert 150 is essentially the same when the wear plate/piercing tip insert 150 is rotated by 180° around pivot axis 168. Pivot axis 168 passes centrally through the wear plate/piercing tip insert 150, e.g., through the center of the circular boss 166 when just one is provided or with the bosses arranged symmetrically with respect to the pivot axis 168 when multiple bosses are provided, and pivot axis 168 extends normal to the planar surface 164. In particular, the profile of the wear plate/piercing tip insert 150 as seen looking along the pivot axis 168 in the direction of the arrow in FIG. 7, including the contours of and the extent to which the tip portions 158 protrude toward the side 160, will be essentially the same when the wear plate/piercing tip insert 150 is rotated by 180° about the pivot axis 168. By "essentially the same," it is meant that deviations such as small bumps, ridges, cavities, differences in thickness, etc., that may be present but that do not prevent the wear plate/piercing tip insert 150 from being secured to the nose portion 136 in multiple orientations are deemed not to destroy the "pivotal symmetry" of the wear plate/piercing tip insert 150.

Like the boss 166 (or bosses or dowel(s)), the tip portions 158 provide bearing support for the wear plate/piercing tip insert 150 during cutting and retraction operation of the movable jaw 104. Therefore, the contours of the tip portions 158 are preferably configured to optimize load transfer into the structural sections of the upper, movable jaw 104.

As illustrated in FIG. 5, the nose portion 136 of the upper, movable jaw 104 has a surface 170 that is located on the side of the movable jaw 104 opposite to the side on which the blade insert members 128 are mounted, and that surface 170 is recessed slightly relative to surface 172 of the upper, movable jaw 104. The surface 170 is recessed by an amount that is the same as the thickness $t_C$ (FIG. 7) of the central region 154 of the wear plate/piercing tip insert 150.

The nose portion 136 also has a pocket or cavity 174 formed near an upper edge 176 thereof. The pocket or cavity 174 extends laterally, from the surface 170 toward the opposite side of the upper, movable jaw 104 to which the blade insert members 128 are attached, by an amount that is equal to the thickness $t_W$ (FIG. 7) of the tip portions 158 of the wear plate/piercing tip insert 150 (the thickness $t_W$ being equal to the thickness $t_C$ of the central region of the wear plate/piercing tip insert 150 and the amount by which the tip portions 158 protrude laterally relative to the central region 154). The contours of the pocket or cavity 174 match the contours of the surfaces 175 of the laterally extending tip portions 158.

In addition to the pocket or cavity 174, a cut-out or notch 178 is formed in an underside 180 of the nose portion 136 of the upper, movable jaw 104. The cut-out or notch 178 may extend laterally across the entire width of the nose portion 136. As is the case for the pocket or cavity 174, the contours of the cut-out or notch 178 match the contours of the surfaces 175 of the tip portions 158 of the wear plate/piercing tip insert 150, although only to the extent the surfaces 175 of the tip portions 158 will engage the surfaces of the notch 178 when the wear plate/piercing tip insert 150 is mounted to the nose portion 136 of the movable jaw member 104. In other words, the contours of the notch 178 will be the same as just a portion of the contours of the pocket or cavity 174.

A circular depression or bore 182 extends laterally from the surface 170 toward the opposite side of the nose portions 136, to which the blade insert members 128 are attached. The contours of the circular depression 182 match the contours of the central, circular boss 166, and the circular depression 182 extends laterally by an amount that is equal to the height of the central, circular boss 166, i.e., by an amount that is the same as the distance to which the central, circular boss 166 protrudes relative to the central region 154 of the wear plate/piercing tip insert 150. With this configuration, the wear plate/piercing tip insert 150 can be seated securely onto the nose portion 136, with the surface 155 of the central region 154 seating firmly against seating surface 170, one of the tip portions 158 fitting firmly and closely within pocket or cavity 174, a portion of the surface 175 of the other tip portion 158 engaging and mating with the surface of cut-out or notch 178, and the central, circular boss 166 extending into and mating with the circular depression 182. Of course, if multiple bosses (or dowels) are provided, a corresponding number of depressions or bores 182 will also be provided, in a corresponding configuration or arrangement.

The tip portions 158 of the wear plate/piercing tip insert 150 each have a pair of side surfaces 184 and 186 that are exposed when a given tip portion 158 is in the lower, operative position. The front-facing side surface 184 of the tip portion 158 that is in the lower, operative position is identified in FIG. 6, and the bottom-facing side surface 186 (bottom-facing when the tip portion is in the operative position) is identified in FIG. 6 for the tip portion 158 that is in the upper, non-operative position. The front-facing side surfaces and bottom-facing side surfaces intersect each other along piercing edges 188. Additionally, the bottom-facing side surfaces 186 intersect the planar surface 164 along shearing edges 190.

In the illustrated embodiment of a shears 100 according to the invention, one of the hardened steel blade insert members 128 extends forwardly all the way to the front of the nose portion 136, as illustrated in FIG. 6. In that case, the forward-facing side surfaces 184 are preferably configured to be co-planar with the forward-facing end surfaces 129 of the blade insert members 128 when both the wear plate/piercing tip insert 150 and blade insert members 128 are installed in their respective operative positions on the upper, movable jaw 104. Furthermore, the piercing edges 188 are preferably co-linear with the bottom-facing piercing edge 131 of the forwardmost blade insert member 128 when the wear plate/piercing tip insert 150 and blade insert members 128 are installed in their operative positions on the nose portion 136 of the upper, movable jaw 104.

Similarly, the bottom-facing side surfaces 186 are preferably configured such that the bottom-facing side surface 186 of the tip portion 158 that is in the lower, operative position is co-planar with a bottom-facing side surface (not visible or labeled) of the forwardmost blade insert member 128. Thus, in this configuration, the tip portion 158 that is in the lower, operative position and the forward portion of the forwardmost blade insert member 128 work together or are combined to form the effective piercing tip region PT, as identified in FIGS. 3 and 4.

Alternatively, as illustrated in FIGS. 9-12, if the blade insert member 128" does not extend all the way forward to the forwardmost extent of the nose portion 136" of the movable jaw 104", it is preferable for the tip portions 158" of the wear plate/piercing tip inserts 150" to extend laterally, i.e, to have thicknesses $t_w$, sufficient to extend all the way across the width of the nose portion 136" of the upper, movable jaw 104". Although the entirety of the tip portions 158" may extend laterally all the way across the width of the nose portion 136", it is also possible to have just an extension portion 158b" that protrudes from the main portion 158a" of the tip portion 158" that extend all the way across the width of the nose portion 136", as illustrated in FIGS. 9-12.

Like the prior art shears 900, the shears 100 according to the invention has an inner-facing surface 138 on the guide member 120 and a hardened steel wear insert 142.

During operation of the shears 100, a workpiece held between the lower, fixed jaw 102 and the upper, movable jaw 104 is cut or sheared by means of the steel blade insert members 126 and 128 as the upper, movable jaw is driven to pivot closed relative to the lower, fixed jaw 102. As the upper, movable jaw closes on the workpiece being sheared, the movable jaw is forced laterally slightly, away from the fixed blade member 116 and toward the guide member 120. As a result, the planar surface 164 of the wear plate/piercing tip insert 150 will bear against and slide along the wear insert 142.

The metal demolition shears 100 can also be used to cut and demolish generally flattened scrap metal. In that case, if the sheet of scrap metal rests on the lower, fixed jaw 102, the piercing tip portion PT of the nose portion 136 will make initial contact with the scrap metal as the shears are being operated and will pierce its way through the scrap metal workpiece. In that situation, the piercing edge 188 of the tip portion 158 that is in the operative position, along with the bottom-facing piercing edge 131, will operate to help the tip portion of the nose portion 136 pierce its way through the scrap metal workpiece. As the upper, movable jaw 104 continues to close relative to the lower, fixed jaw 102 and the tip portion TP pierces its way through the workpiece, the piercing edge 188, along with the bottom-facing piercing edge 131, will co-act with the cross member insert 146 to cut the metal workpiece in piercing fashion. Additionally, the shearing edge 190 of the tip portion 158 that is in the operative position will cooperate or co-act with the upper, inner-facing edge of the wear insert 142 to cut the flattened metal workpiece, in shearing fashion.

As a result of continued operation of the shears 100, the various operative edges and surfaces of the wear plate/piercing tip insert 150, namely, the piercing edge 188, the shearing edge 190, and the portion of the planar surface 164 that is disposed in the region of the tip portion 158 that is in the lower, operative position, will become dull, chipped, worn, or otherwise degraded in their functioning capacities. When the various edges and surfaces have become overly worn, a fresh set of piercing and shearing edges and a fresh wear surface portion of the planar surface 164 can be presented simply by removing the cap screws or plow bolts 152, rotating the wear plate/piercing tip insert 150 by 180° around its pivot axis 168, and reinstalling and securing it back to the nose portion 136 of the upper, movable jaw 104 with the cap screws or plow bolts 152.

Figure 13:
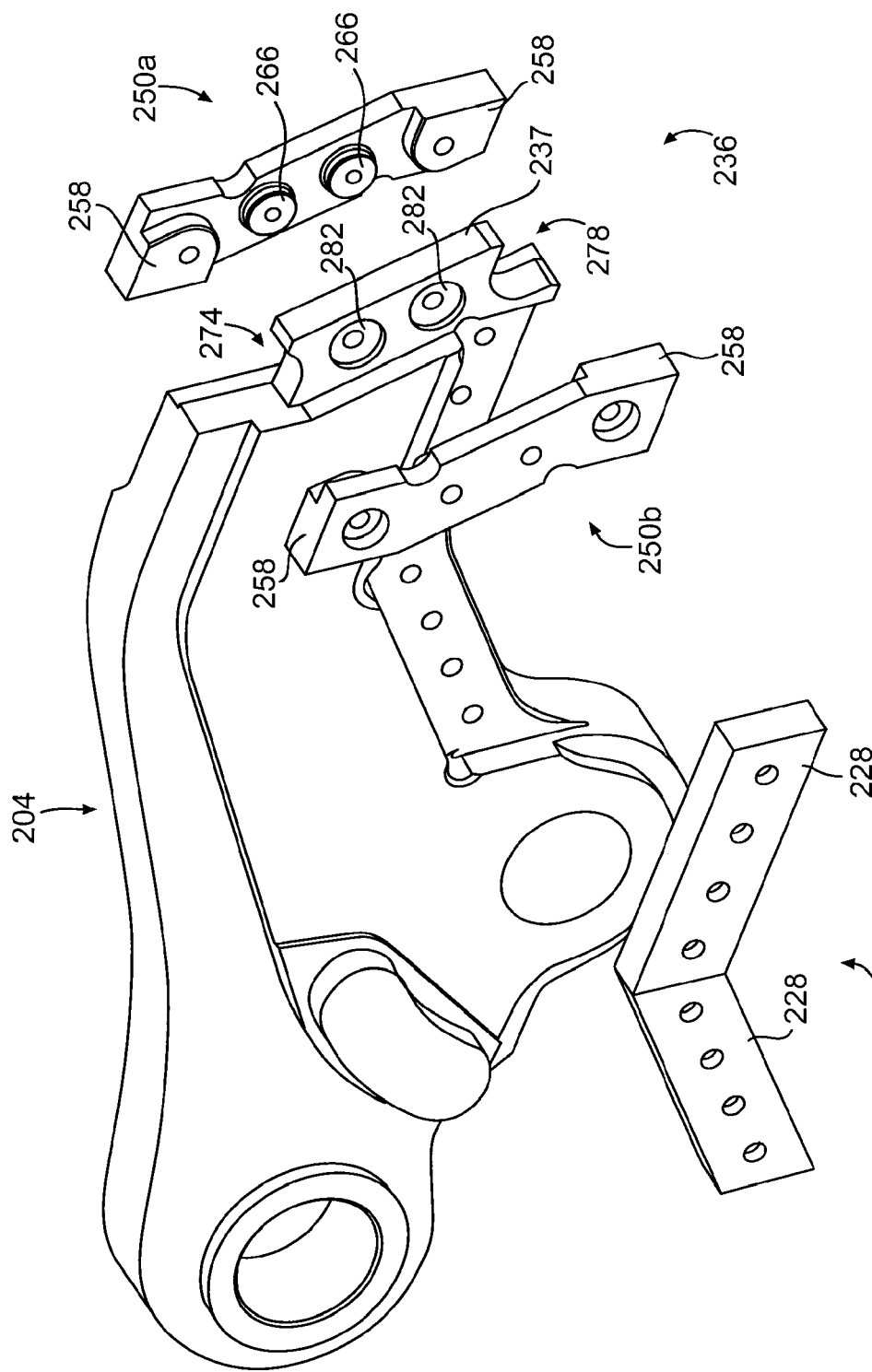
FIG. 13 is an exploded, perspective view showing another alternate embodiment of the upper, movable jaw of a metal demolition shears according to the invention.

In yet another embodiment 200 of a metal demolition shears according to the invention, as illustrated in FIG. 13, two wear plate/shearing tip inserts 250a and 250b may be used, with one located on either side of the nose portion 236 of the movable upper jaw 204. In addition to each wear plate/shearing tip insert 250a and 250b being longitudinally symmetric, as defined above, the wear plate/shearing tip inserts 250a and 250b are "mirror image symmetric" with respect to each other. In other words, whereas the one wear plate/shearing tip insert 250a angles up and to the right from one end to the other, as viewed straight on when it is attached to the nose portion 236 of the upper, movable jaw 204, the other wear plate/shearing tip insert 250b angles up and to the left from the one end to the other, as viewed straight on when it is attached to the nose portion 236 of the upper, movable jaw 204.

The nose portion 236 is, itself, configured to receive and seat the wear plate/piercing tip inserts 250a and 250b appropriately, with a "pocket" or "cavity" 274 that extends all the way across the width of the center "keel" portion 237 of the nose portion 236 and a notch or cut-out 278 that also extends all the way across the keel portion 237. (The forward blade insert 228 does not extend all the way forward.) In this embodiment, the two wear plate/piercing tip inserts 250a and 250b are bolted together using cap screws or bolts (not shown) passing through the bosses 266 (which seat within depressions 282 on either side of the keel 237) and protruding tip portions 258. This effectively sandwiches the keel portion between the wear plate/piercing tip inserts.

As a result, of this configuration, the tip portions 258 provide the entire piercing tip function. Additionally, excellent wear protection is provided on both sides of the nose portion, and the configuration permits indexability of the wear plate/piercing tip inserts on each side of the jaw 204. Finally, although not illustrated, the configuration of the wear plate/piercing tip inserts 250a and 250b may also be such as to permit them to be interchanged from one side of the nose portion 236 to the other.

The embodiments of the invention described herein are illustrative, and the invention is not deemed to be limited to those specific embodiments. Modifications to the described invention will, of course, occur to those having skill in the art, and such modifications to the disclosed embodiment that are within the spirit of the invention are deemed to be embraced by the following claims.

What is claimed is:

1. A metal demolition shears comprising:
a first jaw;
a second jaw operatively connected to the first jaw for movement relative to the first jaw; and
a piercing tip insert attached at a nose portion of the second jaw in a first operative position, the piercing tip insert comprising a metal body having first and second ends and first and second sides, the metal body comprising
a central region having a surface,
a first metal tip portion disposed at the first end, the first metal tip portion protruding laterally with respect to the surface of the central region in the direction of the first side of the body so as to define a first piercing tip, wherein the first piercing tip is presented for use and extends at least partially across the width of the nose portion of the second jaw, and
a second metal tip portion disposed at the second end, the second metal tip portion protruding laterally with respect to the surface of the central region in the direction of the first side of the body so as to define a second piercing tip,
wherein the shears are shaped and configured such that the piercing tip insert can be detached from the second jaw and then attached to the second jaw in a second operative position in which the second piercing tip is presented for use and extends at least partially across the width of the nose portion of the second jaw,
wherein said second side of said body is opposite to said first side and has a generally planar surface to define a wear surface of said piercing tip insert.

2. A metal demolition shears comprising:
a first jaw;
a second jaw operatively connected to the first jaw for movement relative to the first jaw; and
a piercing tip insert attached at a nose portion of the second jaw in a first operative position, the piercing tip insert comprising a metal body having first and second ends and first and second sides, the metal body comprising
a central region having a surface,
a first metal tip portion disposed at the first end, the first metal tip portion protruding laterally with respect to the surface of the central region in the direction of the first side of the body so as to define a first piercing tip, wherein the first piercing tip is presented for use and extends at least partially across the width of the nose portion of the second jaw, and
a second metal tip portion disposed at the second end, the second metal tip portion protruding laterally with respect to the surface of the central region in the direction of the first side of the body so as to define a second piercing tip,
wherein the shears are shaped and configured such that the piercing tip insert can be detached from the second jaw and then attached to the second jaw in a second operative position in which the second piercing tip is presented for use and extends at least partially across the width of the nose portion of the second jaw,
wherein the nose portion of the second jaw has a notch formed in an underside thereof;
wherein the notch has surface contours that mate with and match surface contours of the first metal tip portion when the piercing tip insert is in the first operative position; and
wherein the notch has surface contours that mate with and match surface contours of the second metal tip portion when the piercing tip insert is in the second operative position.

3. A metal demolition shears comprising:
a first jaw;
a second jaw operatively connected to the first jaw for movement relative to the first jaw; and
a piercing tip insert attached at a nose portion of the second jaw in a first operative position, the piercing tip insert comprising a metal body having first and second ends and first and second sides, the metal body comprising
a central region having a surface,
a first metal tip portion disposed at the first end, the first metal tip portion protruding laterally with respect to the surface of the central region in the direction of the first side of the body so as to define a first piercing tip, wherein the first piercing tip is presented for use and extends at least partially across the width of the nose portion of the second jaw, and
a second metal tip portion disposed at the second end, the second metal tip portion protruding laterally with respect to the surface of the central region in the direction of the first side of the body so as to define a second piercing tip,
wherein the shears are shaped and configured such that the piercing tip insert can be detached from the second jaw and then attached to the second jaw in a second operative position in which the second piercing tip is presented for use and extends at least partially across the width of the nose portion of the second jaw,
wherein the piercing tip insert further comprises a plurality of bosses or dowels that are located between said metal tip portions and that extend laterally from said central region in the direction of the first side of said body;
wherein the nose portion of the second jaw has a plurality of bores or depressions extending laterally inwardly from a surface thereof; and
wherein the plurality of bosses or dowels extend into respective ones of the plurality of bores or depressions.

4. The metal demolition shears of claim 3, wherein:
the second operative position is a position in which said piercing tip insert is rotated 180° relative to the first operative position about a pivot axis; and
the plurality of bosses or dowels are spaced equal distances away from the pivot axis.

5. A metal demolition shears comprising:
a first jaw;
a second jaw operatively connected to the first jaw for movement relative to the first jaw; and
a piercing tip insert attached at a nose portion of the second jaw in a first operative position, the piercing tip insert comprising a metal body having first and second ends and first and second sides, the metal body comprising
a central region having a surface,
a first metal tip portion disposed at the first end, the first metal tip portion protruding laterally with respect to the surface of the central region in the direction of the first side of the body so as to define a first piercing tip, wherein the first piercing tip is presented for use and extends at least partially across the width of the nose portion of the second jaw, and
a second metal tip portion disposed at the second end, the second metal tip portion protruding laterally with respect to the surface of the central region in the direction of the first side of the body so as to define a second piercing tip, wherein the shears are shaped and configured such that the piercing tip insert can be detached from the second jaw and then attached to the second jaw in a second operative position in which the second piercing tip is presented for use and extends at least partially across the width of the nose portion of the second jaw, and wherein the nose portion of the second jaw has a pocket or cavity extending laterally inwardly from a surface thereof into which the second metal tip portion of the piercing tip insert extends when the piercing tip insert is in the first operative position.

6. The metal demolition shears of claim 5, wherein the first metal tip portion of the piercing tip insert extends into the pocket or cavity when the piercing tip insert is in the second operative position.

7. A metal demolition shears, comprising:
a first jaw;
a second jaw operatively connected to the first jaw for movement relative to the first jaw; and
a piercing tip insert attached at a nose portion of the second jaw in a first operative position, the piercing tip insert comprising a metal body having first and second ends and first and second sides, the metal body comprising
a central region having a surface,
a first metal tip portion disposed at the first end, the first metal tip portion protruding laterally with respect to the surface of the central region in the direction of the first side of the body so as to define a first piercing tip, wherein the first piercing tip is presented for use and extends at least partially across the width of the nose portion of the second jaw, and
a second metal tip portion disposed at the second end, the second metal tip portion protruding laterally with respect to the surface of the central region in the direction of the first side of the body so as to define a second piercing tip,
wherein the shears are shaped and configured such that the piercing tip insert can be detached from the second jaw and then attached to the second jaw in a second operative position in which the second piercing tip is presented for use and extends at least partially across the width of the nose portion of the second jaw, wherein the first metal tip portion has a first shearing edge on the second side of said body that is in an operative shearing position when the piercing tip insert is attached to the second jaw in the first operative position, and wherein the second metal tip portion has a second shearing edge on the second side of said body that is in an operative shearing position when the piercing tip insert is attached to the second jaw in the second operative position.

8. The metal demolition shears of claim 7, wherein:
the first metal tip portion has a first piercing edge that extends at least partially across the width of the nose portion of the second jaw when the piercing tip insert is attached to the second jaw in the first operative position; and
the second metal tip portion has a second piercing edge that extends at least partially across the width of the nose portion of the second jaw when the piercing tip insert is attached to the second jaw in the second operative position.

9. The metal demolition shears of claim 7, wherein:
the first jaw has a guide member spaced from and extending in generally parallel relation to said first blade member;
the second side of said body is opposite to said first side and has a generally planar surface to define a wear surface that abuts the guide member when the shears move from an open position to a closed position; and
the first and second shearing edges are coplanar with and form edges of said generally planar surface.

10. The metal demolition shears of claim 7, wherein:
the first piercing tip is disposed in a non-operative position when the piercing tip insert is in the second operative position; and
the second piercing tip is disposed in a non-operative position when the piercing tip insert is in the first operative position.

11. The metal demolition shears of claim 7, wherein the second operative position is a position in which said piercing tip insert is rotated 180° relative to the first operative position about a pivot axis.

* * * * *